United States Patent
Muraoka et al.

(10) Patent No.: US 6,824,925 B2
(45) Date of Patent: Nov. 30, 2004

(54) METHOD FOR MANUFACTURING BASE FOR ELECTRODE PLATE, METHOD FOR MANUFACTURING POSITIVE ELECTRODE PLATE AND ALKALINE STORAGE BATTERY

(75) Inventors: Yoshiyuki Muraoka, Kadoma (JP); Ichiro Takeuchi, Yokohama (JP); Yusuke Ozaki, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 198 days.

(21) Appl. No.: 10/193,084

(22) Filed: Jul. 10, 2002

(65) Prior Publication Data

US 2003/0022066 A1 Jan. 30, 2003

(30) Foreign Application Priority Data

Jul. 10, 2001 (JP) .................................... 2001-209129

(51) Int. Cl.⁷ .............................................. H01M 4/80
(52) U.S. Cl. ....................... 429/235; 429/223; 429/232; 429/236
(58) Field of Search ................................ 429/223, 232, 429/235, 236

(56) References Cited

U.S. PATENT DOCUMENTS 4,217,939 A   8/1980   Yanagihara et al.

FOREIGN PATENT DOCUMENTS

| JP | 56-20664   | * | 5/1981  | ............ H01M/4/26 |
| JP | 56-37665   |   | 9/1981  |                        |
| JP | 57-30268   |   | 6/1982  |                        |
| JP | 2-276160   |   | 11/1990 |                        |
| JP | 4-248269   |   | 9/1992  |                        |
| JP | 4-249069   | * | 9/1992  | ............ H01M/4/80 |
| JP | 6-79065    |   | 11/1994 |                        |

* cited by examiner

Primary Examiner—Dah-Wei Yuan
(74) Attorney, Agent, or Firm—Merchant & Gould P.C.

(57) ABSTRACT

A base for an electrode plate that has an excellent ability to retain an active material and can be manufactured at a low cost, a method for manufacturing the same, and an alkaline storage battery using the same are provided. The method includes (i) forming a slurry containing water, a powder containing nickel, and a hollow particle formed of an organic compound, (ii) applying the slurry to a support made of metal, thereby forming a sheet, and (iii) burning the sheet, thereby forming a porous layer joined to the support by a metallic bond.

12 Claims, 5 Drawing Sheets

METHOD FOR MANUFACTURING BASE FOR ELECTRODE PLATE, METHOD FOR MANUFACTURING POSITIVE ELECTRODE PLATE AND ALKALINE STORAGE BATTERY

BACKGROUND OF THE INVENTION

1. Field of the Invention

The present invention relates to a method for manufacturing a base for an electrode plate that can be used in a storage battery, a method for manufacturing a positive electrode plate, and an alkaline storage battery.

2. Description of Related Art

Nickel positive electrodes for alkaline storage batteries are classified mainly into a sintered type and a non-sintered type. Suggested as an example of the latter non-sintered type positive electrodes are the ones obtained by supporting nickel hydroxide particles with a nickel foam substrate having a porosity of about 95% (see JP 56(1981)-37665 B, JP 56(1981)-20664 B and JP 57(1982)-30268 B), which are in wide use currently. However, the nickel foam substrate is expensive because its manufacturing method is complicated.

On the other hand, substrates such as a punched sheet and an expanded metal are inexpensive because they can be formed by processing metal foils. However, these substrates do not have a three-dimensional structure, causing a problem in that an active material sheds from the substrate easily.

In order to solve such a problem, an attempt has been made to manufacture a substrate by processing a metal foil three-dimensionally. For example, it is reported that a metal foil is processed so as to provide a substrate with both sides on which protrusions are formed (see JP 6(1994)-79065 U). However, even when using this substrate, the active material cannot be prevented from shedding sufficiently.

On the other hand, a method for manufacturing the sintered type nickel positive electrodes includes forming a base having nickel layers with a porosity of about 85% on the surfaces of a metal support, immersing this base in an aqueous solution containing nickel nitrate as a main solute, then immersing it in an alkaline solution containing sodium hydroxide as a main solute, thereby filling nickel hydroxide in the base. Thereafter, the above processes are repeated until the nickel hydroxide is filled in a predetermined amount. However, with this method, it has been difficult to achieve a higher capacity because the support has a porosity of only 85%. In response to his, JP 2951008 B discloses a method including producing a base having a porosity of 90% or more and filling it with nickel hydroxide by the above-described method. Ithis case, the base having a porosity of 90% or more is produced by using paste to which hollow particles are added.

However, this method has the following problems: (1) When immersing the base in nickel nitrate, the corrosion of metal lowers a cohesive strength between the metal support and the porous nickel layers, thus separating them in some cases. (2) When substituting alkali for nickel nitrate, since an active material to be deposited has a large specific surface area, it has been difficult to fill the active material densely. (3) When filling the active material, it has been very difficult to disperse an electrically conductive agent such as a cobalt compound uniformly between the active materials and to use as the active material nickel hydroxide with which an additive such as a zinc compound forms a solid solution. If no additive is allowed to form a solid solution with it as described above, there is a problem that a longer lifetime cannot be achieved.

SUMMARY OF THE INVENTION

In view of the problems described above, it is an object of the present invention to provide a method for manufacturing a base for an electrode plate that has an excellent ability to retain an active material and can be manufactured at a low cost, a method for manufacturing a positive electrode plate, and an alkaline storage battery using the same.

In order to achieve the above-mentioned object, a first method for manufacturing a base for an electrode plate according to the present invention is a method for manufacturing a base for an electrode plate used as an electrode plate of a storage battery and includes (i) forming a slurry containing water, a powder containing nickel, and a hollow particle formed of an organic compound, (ii) applying the slurry to a support made of metal, thereby forming a sheet, and (iii) burning the sheet, thereby forming a porous layer joined to the support by a metallic bond. This first manufacturing method makes it possible to manufacture the base for an electrode plate of the present invention easily.

In the above-described manufacturing method, the powder may be adsorbed on a surface of the hollow particle. In this case, the slurry may contain stearic acid, and the powder may be adsorbed on the hollow particle via the stearic acid. With this structure, the powder containing nickel can be adsorbed on the particle easily.

In the above-described manufacturing method, the slurry may contain a thickener. With this structure, the dispersiveness of the powder containing nickel improves, thus obtaining a base having a porosity with more uniform distribution. In this case, the thickener may contain at least one selected from the group consisting of cellulose, a cellulose derivative and polyvinyl alcohol. With this structure, it is possible to obtain a base having less variation in thickness and a porosity with more uniform distribution.

In the above-described manufacturing method, the hollow particle may contain a polymer formed by polymerizing a monomer containing at least one selected from the group consisting of methyl methacrylate, acrylonitrile and vinylidene chloride, and at least one selected from the group consisting of isobutane, isopentane and isooctane may be sealed in the hollow particle. With this structure, the particle can be expanded easily by a heat treatment.

In the above-described manufacturing method, the hollow particle in the (i) forming may have a diameter ranging from 10 to 40 $\mu$m, and after the (ii) applying and before the (iii) burning, the method may include the process of expanding the hollow particle by heat-treating the sheet so that the hollow particle achieves a maximum diameter ranging from 100 to 300 $\mu$m. With this structure, the dispersiveness of the particle in the paste during the (i) forming improves, thus obtaining a base having a porosity with more uniform distribution.

In the above-described manufacturing method, the hollow particle in the (i) forming may have a diameter ranging from 100 to 300 $\mu$m. With this structure, a stronger base can be obtained.

In the above-described manufacturing method, the powder may contain at least one material selected from the group consisting of a metallic nickel and a nickel compound. With this structure, a porous layer made of nickel can be formed easily.

Furthermore, a first method for manufacturing a positive electrode plate for an alkaline storage battery according to the present invention includes filling a base with a slurry containing a binder and an active material powder containing nickel hydroxide, followed by drying and rolling. The base includes a support made of metal and a porous layer formed on the support. The porous layer is made of nickel and has a porosity ranging from 90% to 98%. The support and the porous layer are joined by a metallic bond.

Moreover, a second method for manufacturing a positive electrode plate for an alkaline storage battery according to the present invention includes (I) filling a base with an active material powder containing nickel hydroxide and rolling it, thereby forming a sheet including the base and an active material filled in the base, (II) immersing the sheet in a solution in which a binder is dispersed, thereby making the binder adhere to a surface of the sheet, and (III) drying and rolling the sheet to which the binder has adhered. The base includes a support made of metal and a porous layer formed on the support. The porous layer is made of nickel and has a porosity ranging from 90% to 98%. The support and the porous layer are joined by a metallic bond. The above-described first and second manufacturing methods employ a base having an excellent ability to retain an active material, and therefore, with these manufacturing methods, a positive electrode plate that makes it possible to constitute an alkaline storage battery with excellent high-rate discharge characteristics, a high capacity and a longer lifetime can be provided. In addition, since a base that can be provided at a low cost is used, a positive electrode plate can be manufactured at a low cost.

In the above-described first and second methods for manufacturing a positive electrode plate, the support may be a processed foil obtained by forming protrusions on a surface of a metal foil or a punched metal sheet obtained by forming through holes in a metal foil, and the metal foil may be a nickel foil formed by electroplating or a metal foil whose surface is coated with nickel. With this structure, a positive electrode plate that makes it possible to constitute an alkaline storage battery with a high power and a high capacity can be provided at a low cost.

In addition, an alkaline storage battery according to the present invention includes a positive electrode plate. The positive electrode plate includes the base for an electrode plate manufactured by the manufacturing method of the present invention, and an active material powder containing nickel hydroxide filled in the base. Since an alkaline storage battery of the present invention employs the base manufactured by the manufacturing method of the present invention, it is possible to achieve a storage battery having excellent charge-discharge cycle characteristics, a storage battery having a large discharge capacity when discharged with a large electric current, or a storage battery having a high utilization factor of a positive electrode.

DESCRIPTION OF THE PREFERRED EMBODIMENTS

The following is a description of embodiments of the present invention, with reference to the accompanying drawings.

First Embodiment

Figure 1:
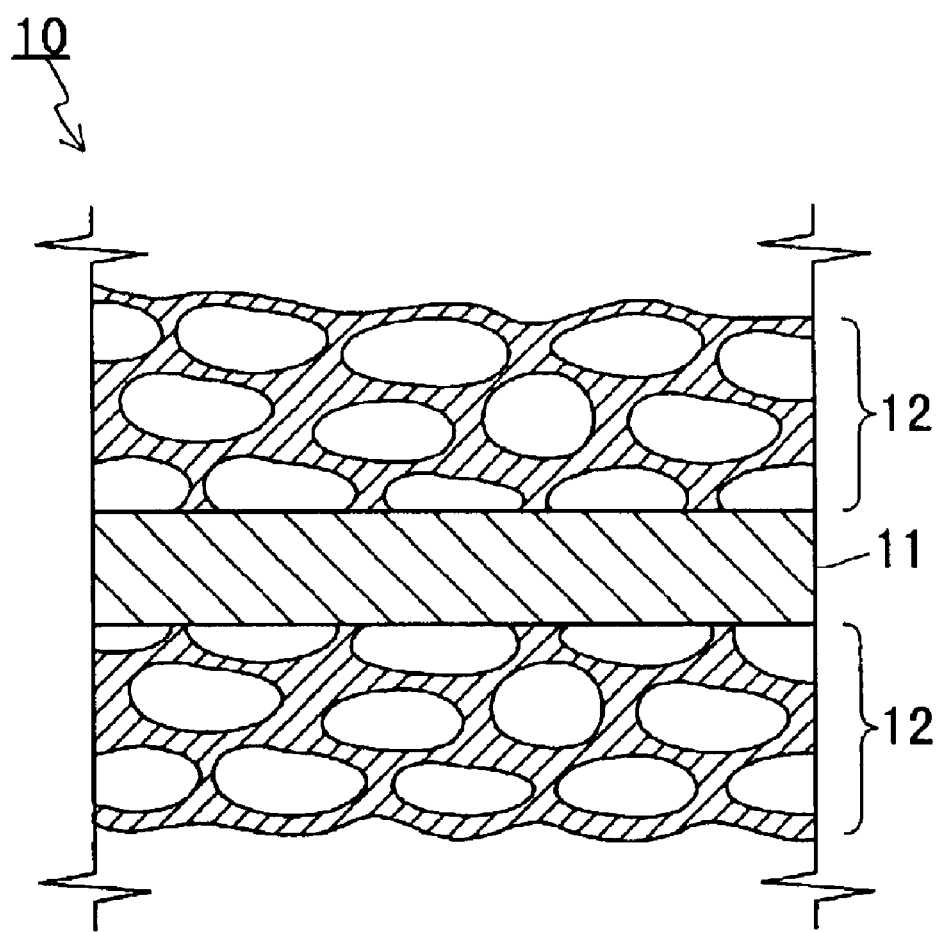
FIG. 1 is a sectional view schematically showing an example of a base for an electrode plate manufactured according to a manufacturing method of the present invention.

A first embodiment is directed to a base for an electrode plate manufactured by a manufacturing method according to a second or third embodiment. This base is used in a method for manufacturing a positive electrode plate according to a fourth embodiment. FIG. 1 schematically shows a cross-section of a base 10 for an electrode plate of the first embodiment.

Referring to FIG. 1, the base 10 for an electrode plate includes a support 11 and porous layers 12 formed on the support 11. The base 10 can be used as a core material of an electrode plate of a storage battery such as an alkaline storage battery. Although pores in the porous layers 12 appear to be separate in FIG. 1, they are connected in many positions in reality and have openings on their surfaces (as is the case with FIGS. 2 and 3 as well). In other words, the porous layers 12 can be filled with powder or slurry from outside.

The support 11 is made of metal and can be a metal foil whose surfaces at least are formed of nickel, for example. More specifically, the support 11 can be a nickel foil or an iron foil whose surfaces are plated with nickel. Such a metal foil has a thickness ranging, for example, from 10 to 40 $\mu$m. Alternatively, a processed foil obtained by forming a plurality of protrusions on surfaces of this metal foil or a punched metal sheet obtained by forming a plurality of through holes in this metal foil may be used as the support 11. Such a processed foil can be obtained, for example, by forming through holes with a needle from both sides of the metal foil so as to form a plurality of cone-shaped protrusions on both sides.

The porous layers 12 are made of nickel and have a porosity ranging from 90% to 98% (preferably, 94% to 96%). It is preferable that the surfaces of the support 11 are made of nickel and that the support 11 and the porous layers 12 are joined to each other by a metallic bond formed by a diffusion of metallic elements (a diffusion bonding).

Since the porous layers 12 support the active material powder, the base 10 for an electrode plate of the first embodiment has a great ability to prevent the shedding of the active material. Thus, according to this base 10, it is possible to form a storage battery having excellent charge-discharge cycle characteristics, a storage battery having a large discharge capacity when discharged with a large electric current, or a storage battery having a high utilization factor of a positive electrode. In addition, since the base 10 can be manufactured by the method described in the second or third embodiment, it can be manufactured at a low cost.

Second Embodiment

Figure 2A:
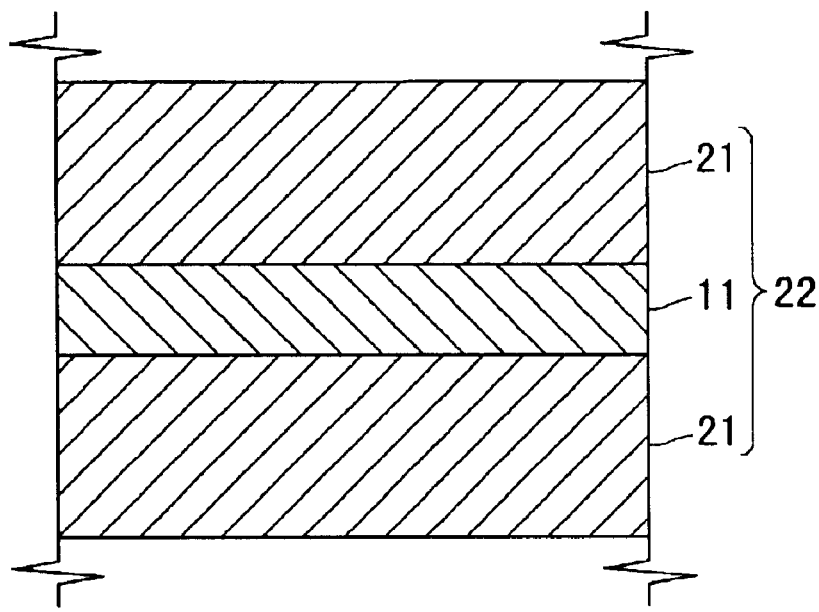
FIGS. 2A and 2B are sectional views schematically showing an exemplary process flow of the manufacturing method of the present invention for manufacturing a base for an electrode plate.
Figure 2B:
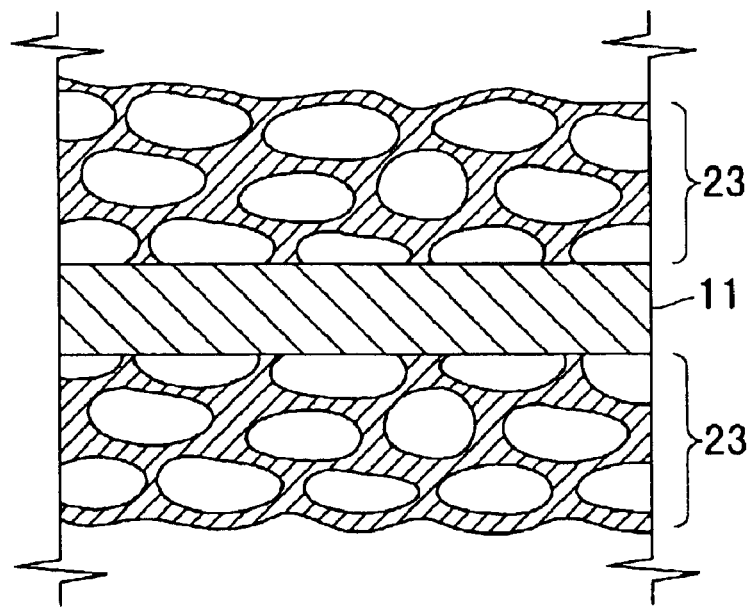

The second embodiment is directed to a first method of the present invention, for manufacturing a base for an electrode plate. FIGS. 2A and 2B are sectional views showing a process flow of the manufacturing method of the second embodiment. The portions similar to those described in the first embodiment are given the same numerals, and the redundant description thereof will be omitted here.

In the manufacturing method of the second embodiment, first, slurry (in the following, referred to as slurry 21) containing water, powder containing nickel (in the following, sometimes referred to as powder A), and hollow particles formed of an organic compound (in the following, sometimes referred to as particle B) is formed (process (i)). The slurry 21 normally contains a thickener and also may contain a binder and an antifoaming agent.

As the powder A, powder formed of at least one material selected from metallic nickel and a nickel compound can be used. The nickel compound can be a nickel carbonyl or the like. The powder A further may contain a small amount of cobalt oxide powder or metallic cobalt powder. The mean particle diameter of the powder A ranges, for example, from 0.5 to 3 $\mu$m.

The particle B can be formed of a polymer obtained by polymerizing a monomer containing at least one selected from methyl methacrylate, acrylonitrile and vinylidene chloride. It is preferable that at least one selected from isobutane, isopentane and isooctane is sealed in the particle B. This particle B can be the one that is commercially available. In the case where the particle B is expanded in a later process, the particle diameter of the particle B in the process (i) ranges, for example, from 10 to 40 $\mu$m. In the case where the particle B is not expanded in a later process, the particle diameter of the particle B in the process (i) ranges, for example, from 100 to 300 $\mu$m.

The thickener can be at least one selected from cellulose, a cellulose derivative and polyvinyl alcohol. The cellulose derivative can be methylcellulose, carboxymethylcellulose or hydroxymethylcellulose. These thickeners also function as a binding agent for binding the metal foil, the powder A and the particle B.

Next, as shown in FIG. 2A, the above-described slurry 21 is applied to the support 11 made of metal, thereby forming a sheet 22 (process (ii)). The support 11 is a support described in the first embodiment. The slurry 21 can be applied by, for example, a doctor blade method or a die coating method.

Then, the sheet 22 is dried as necessary. By selecting an appropriate drying condition and a kind of the particle B, the particle B can be expanded. For example, when at least one selected from isobutane, isopentane and isooctane is sealed inside, the particle B can be expanded by a heat treatment during drying. More specifically, it is appropriate to dry the sheet 22 by a heat treatment at about 120° C., for example. This heat treatment makes it possible to expand the particle B so that the maximum particle diameter thereof ranges from 100 to 300 $\mu$m. On the other hand, by drying the sheet 22 at a lower temperature, it is possible to prevent the particle B from expanding.

Subsequently, the sheet 22 is burned, thereby forming porous layers 23 joined to the support 11 by a metallic bond formed by a diffusion of metallic elements (a diffusion bonding) as shown in FIG. 2B (process (iii)). The porous layers 23 correspond to the porous layers 12. The porosity of the porous layers 23 ranges from 90% to 98% (preferably, 94% to 96%). By burning the sheet 22, the powder A contained in the sheet 22 sinters, so that the porous layers 23 are formed. In this manner, the base for an electrode plate is manufactured. This base can be used as a core material for an electrode plate used in a storage battery such as an alkaline storage battery.

In accordance with the manufacturing method of the second embodiment, the base for an electrode plate described in the first embodiment can be manufactured easily.

Third Embodiment

Figure 3A:
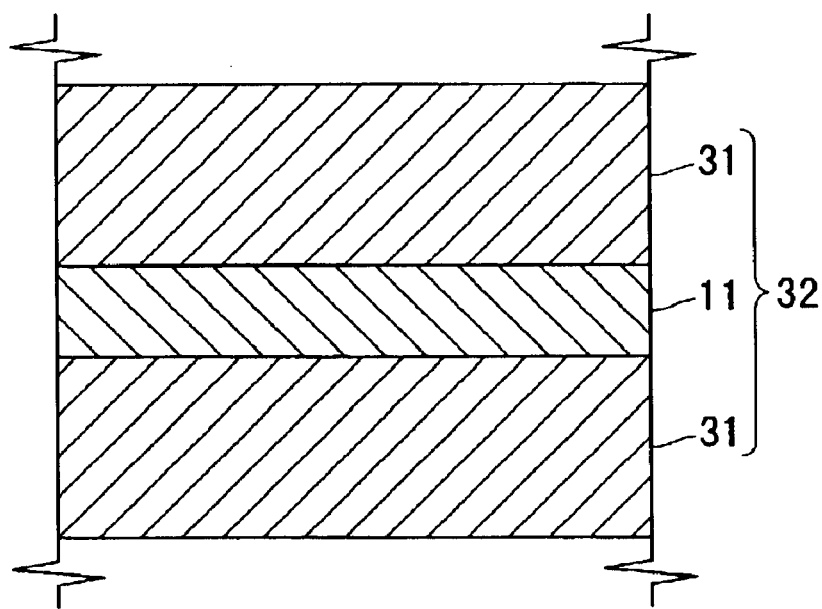
FIGS. 3A and 3B are sectional views schematically showing another exemplary process flow of the manufacturing method of the present invention for manufacturing a base for an electrode plate.
Figure 3B:
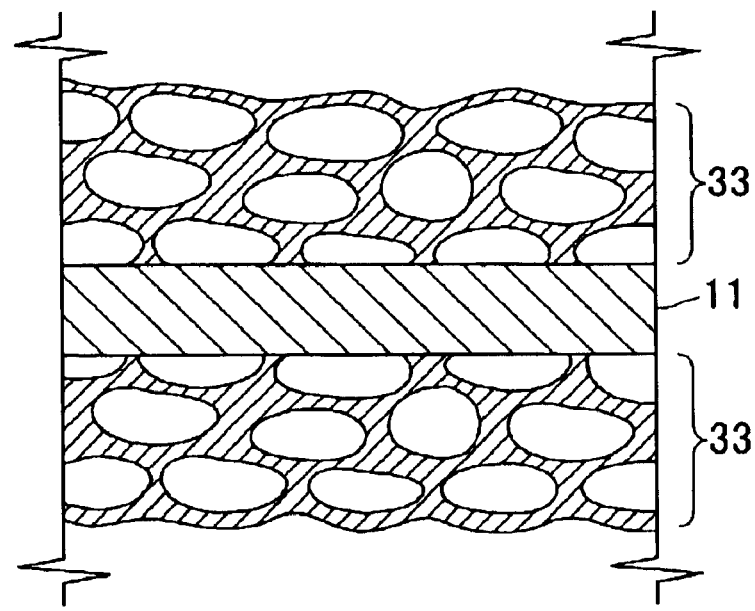

The third embodiment is directed to a second method of the present invention, for manufacturing a base for an electrode plate. FIGS. 3A and 3B are sectional views showing a process flow of the manufacturing method of the third embodiment. The portions similar to those described in the first and second embodiments are given the same numerals, and the redundant description thereof will be omitted here.

In the manufacturing method of the third embodiment, first, slurry (in the following, referred to as slurry 31) containing water, powder containing nickel (powder A) and hollow particles formed of an organic compound (particle B) is formed (process (i)). The slurry 31 normally contains a thickener and also may contain a binder and an antifoaming agent. The thickener contained in the slurry 31 can be the one contained in the slurry 21.

The powder A and the particle B can be the ones described in the second embodiment. In the manufacturing method of the third embodiment, the powder A is adsorbed on the surface of the particle B. When the powder A is a metallic nickel powder or a nickel carbonyl powder, the powder A can be adsorbed on the particle B via stearic acid. In this case, the slurry 31 contains the stearic acid.

Next, as shown in FIG. 3A, the above-described slurry 31 is applied to the support 11 made of metal, thereby forming a sheet 32 (process (ii)). This process is similar to the process (ii) described in the second embodiment. In the process (ii), the sheet 32 may be dried or rolled as necessary.

Subsequently, the sheet 32 is burned, thereby forming porous layers 33 joined to the support 11 by a metallic bond formed by a diffusion of metallic elements (a diffusion bonding) as shown in FIG. 3B (process (iii)). The porous layers 33 correspond to the porous layers 12. By burning the sheet 32, the powder A contained in the sheet 32 sinters, so that the porous layers 33 are formed. In this manner, the base for an electrode plate is manufactured. This base can be used as a core material for an electrode plate used in a storage battery such as an alkaline storage battery.

In accordance with the manufacturing method of the third embodiment, the base for an electrode plate of the present invention can be manufactured easily.

Fourth Embodiment

The fourth embodiment is directed to a first method of the present invention, for manufacturing a positive electrode plate for an alkaline storage battery.

The manufacturing method of the fourth embodiment includes the process of filling a base with slurry containing a binder and active material powder containing nickel hydroxide as a principal component, followed by drying and rolling. This process forms a sheet for a positive electrode plate. This sheet is cut as necessary and connected with a lead, thereby producing a positive electrode plate.

The above-described base can be the base 10 for an electrode plate described in the first embodiment, that is, a base for an electrode plate manufactured by the manufacturing method of the second or third embodiment.

The above-described slurry may contain an electrically conductive agent and a thickener other than the active material and the binder. The electrically conductive agent can be a cobalt compound such as cobalt hydroxide. The thickener can be a water-soluble cellulose derivative, a water-soluble acrylic derivative or a polyvinyl alcohol derivative.

The above-described active material powder can be nickel hydroxide powder with which, for example, cobalt or zinc forms a solid solution. The binder can be polytetrafluoroethylene (in the following, sometimes referred to as PTFE), a polyethylene derivative or fluorocarbon rubber.

Fifth Embodiment

The fifth embodiment is directed to a second method of the present invention, for manufacturing a positive electrode plate for an alkaline storage battery.

In the manufacturing method of the fifth embodiment, a base is filled with active material powder containing nickel hydroxide as a principal component, thereby forming a sheet including the base and an active material filled in the base (process (I)). The base can be the base 10 for an electrode plate described in the first embodiment, that is, a base for an electrode plate manufactured by the manufacturing method of the second or third embodiment.

The above-described active material powder can be nickel hydroxide powder with which cobalt or the like forms a solid solution. This active material is filled to the inside of the porous layer of the base. More specifically, it is appropriate to pass the base through a hopper filled with the active material powder while vibrating the hopper.

It is preferable that the process (I) includes a process of rolling the base filled with the active material with two rollers. This process prevents the shedding of the active material.

After the process (I), the sheet is immersed in a solution in which a binder is dispersed, thereby making the binder adhere to the surface of the sheet (process (II)). The solution in which the binder is dispersed can be, for example, a dispersion obtained by dispersing PTFE, a polyethylene derivative or fluorocarbon rubber in water.

Thereafter, the sheet to which the binder has adhered is dried and rolled (process (III)). The process (III) forms a sheet for a positive electrode plate. This sheet is cut as necessary and connected with a lead, thereby producing a positive electrode plate.

Sixth Embodiment

Figure 4:
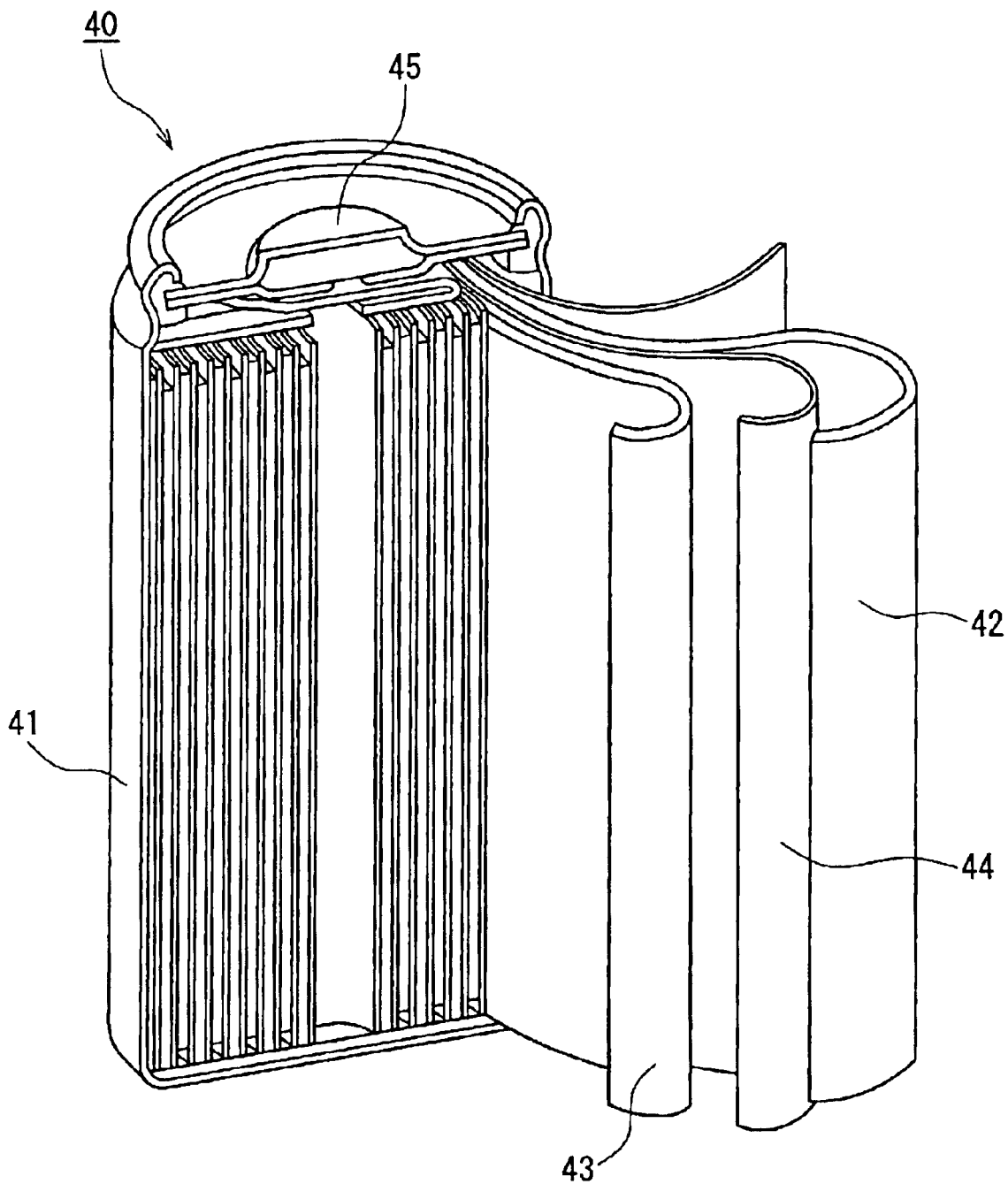
FIG. 4 is a partially exploded perspective view schematically showing an example of an alkaline storage battery according to the present invention.

The sixth embodiment is directed to an alkaline storage battery according to the present invention. FIG. 4 is a partially exploded perspective view showing an alkaline storage battery 40 of the sixth embodiment.

Referring to FIG. 4, the alkaline storage battery 40 includes a case 41, a positive electrode plate 42, a negative electrode plate 43, an electrolyte (not shown), a separator 44 arranged between the positive electrode plate 42 and the negative electrode plate 43, and a sealing plate 45 including a safety valve. The positive electrode plate 42, the negative electrode plate 43, the electrolyte and the separator 44 are sealed in the case 41.

The positive electrode plate 42 can be a positive electrode plate using as a core material the base 11 described in the first embodiment or the base manufactured by the manufacturing method of the second or third embodiment. In other words, the positive electrode plate 42 can be the one manufactured by the manufacturing method of the fourth or fifth embodiment. More specifically, it can be a positive electrode plate including the base for an electrode plate of the present invention and the active material powder supported with this base. The active material can be an active material containing nickel hydroxide as a principal component. The case 41, the negative electrode plate 43, the electrolyte, the separator 44 and the sealing plate 45 can be the ones used generally in an alkaline storage battery. More specifically, the negative electrode plate 43 can be a negative electrode plate formed mainly of a hydrogen absorbing alloy or that formed mainly of cadmium, for example. The separator 44 can be a polypropylene nonwoven fabric or a polyethylene nonwoven fabric that is treated to be hydrophilic by sulfonation or the like. The electrolyte can be an electrolyte containing potassium hydroxide as a main solute.

Since the alkaline storage battery 40 of the sixth embodiment uses the positive electrode plate of the present invention, it is possible to achieve a higher capacity, improved cycle characteristics and an enhanced utilization factor of a positive electrode. Incidentally, the alkaline storage battery shown in FIG. 4 merely is an example, and any alkaline storage battery is suitable as long as it uses the base for an electrode plate of the present invention.

EXAMPLES

The following is a detailed description of the present invention by way of examples.

Example 1

In Example 1, an example of manufacturing the base for an electrode plate of the first embodiment by the manufacturing method of the second embodiment will be described.

First, 2.8 parts by weight of methylcellulose (manufactured by Shin-Etsu Chemical Co., Ltd.: SM400) and 1.1 parts by weight of hydroxypropylcellulose (manufactured by Shin-Etsu Chemical Co., Ltd.: 65SH) were added gradually and dissolved in 100 parts by weight of water at 80° C., thus preparing an aqueous solution of a cellulose derivative. The cellulose derivative was dissolved by rotating the solution at high speed in a disperser.

For the hollow particle B, particles (particle diameter: 200 $\mu$m) whose outer shell was a copolymer of methyl methacrylate and acrylonitrile and whose inner space was filled with isooctane were used. These particles were obtained by heating particles (manufactured by Expancel Inc.) whose particle diameter was 30 $\mu$m and inner space was filled with isooctance at 110° C. and expanding them so as to have a particle diameter of 200 $\mu$m.

Next, 100 parts by weight of metallic nickel powder with a mean particle diameter of 3 $\mu$m, 200 parts by weight of the aqueous solution of the cellulose derivative and 20 parts by weight of the particle B were put into a kneader and mixed for 10 minutes, thus obtaining paste.

Subsequently, the obtained paste was applied to a support, thereby forming a sheet. For the support, a punched metal sheet obtained by forming a plurality of through holes in a 20-$\mu$m-thick pure nickel foil produced by electroplating was used.

Then, the resultant sheet was dried by a heat treatment for 10 minutes at 50° C. followed by a heat treatment at 120° C.

Thereafter, the dried sheet was burned in a nitrogen-hydrogen mixed gas containing water vapor at 950° C. for 20 minutes, thereby sintering the nickel particles. In this manner, the base for an electrode plate (in the following, referred to as a base A) according to the first embodiment was produced.

Example 2

In Example 2, under the same condition as Example 1 except for the powder A, the base for an electrode plate (in the following, referred to as a base B) according to the first embodiment was produced. In Example 2, nickel carbonyl powder (manufactured by INCO Ltd. #255) was used as the powder A.

Example 3

In Example 3, under the same condition as Example 1 except for the particle B, the base for an electrode plate (in the following, referred to as a base C) according to the first embodiment was produced. In Example 3, particles (particle diameter: 30 μm, manufactured by Expancel Inc.) whose outer shell was a copolymer of methyl methacrylate and acrylonitrile and inner space was filled with isooctane were used as the particle B. In other words, unlike Example 1, pre-expanded particles were used as a starting material in Example 3.

Example 4

In Example 4, another example of manufacturing the base for an electrode plate of the first embodiment by the manufacturing method of the third embodiment will be described.

First, an aqueous solution of a cellulose derivative was prepared by the same method as that in Example 1.

For the hollow particle B, the same particles as those in Example 1 were prepared. Then, by using 10 parts by weight of stearic acid, 100 parts by weight of metallic nickel powder with a mean particle diameter of 3 μm was fixed onto the surface of 20 parts by weight of the particle B.

Next, 120 parts by weight of the above-mentioned particle B and 200 parts by weight of the aqueous solution of the cellulose derivative were put into a kneader and mixed for 10 minutes, thus producing paste.

Subsequently, this paste was applied to a support, thereby obtaining a sheet. For the support, the same support as that in Example 1 was used. Thereafter, the sheet was dried and burned under the same condition as that for Example 1. In this manner, the base for an electrode plate (in the following, referred to as a base D) according to the first embodiment was produced.

Example 5

In Example 5, an example of producing a positive electrode plate by the manufacturing method of the fourth embodiment by using the bases A, B, C and D will be described.

First, the active material powder was produced in the following manner. Sodium hydroxide was dropped little by little into an aqueous solution in which nickel sulfate was a main solute and predetermined amounts of cobalt sulfate and zinc sulfate were dissolved, while adjusting the pH of the aqueous solution with ammonia water, so that spherical particles were deposited. These particles were formed of nickel hydroxide with which cobalt and zinc formed a solid solution. These particles were rinsed and dried, thereby obtaining the active material powder.

Next, cobalt hydroxide powder serving as the electrically conductive agent was produced in the following manner. First, a cobalt sulfate solution with a concentration of 1 mol/liter was added little by little to a sodium hydroxide solution and stirred while adjusting the temperature of the solution to be 35° C. and the pH thereof to be 12, so that particles of β-cobalt hydroxide were deposited. These particles were rinsed and dried, thereby obtaining the cobalt hydroxide powder.

Then, by using the active material powder and the cobalt hydroxide powder described above, paste was prepared. First, 100 parts by weight of the active material powder and 10 parts by weight of the cobalt hydroxide powder were mixed sufficiently by a kneader. Subsequently, while stirring the powders continuously, a water dispersion of carboxymethylcellulose (CMC) (with a CMC concentration of 1 part by weight) was added little by little to the powders, followed by kneading for 10 minutes, thereby obtaining paste. Next, a water dispersion of polytetrafluoroethylene (manufactured by Asahi Glass Co., Ltd.: AD936) was added to the obtained paste and mixed, thus obtaining paste for a positive electrode. The water dispersion of polytetrafluoroethylene was added such that the mass ratio of the active material powder to the polytetrafluoroethylene was 100:3. The final water content of the paste for a positive electrode was 23%.

Thereafter, using the paste for a positive electrode, a positive electrode plate was produced in the following manner. First, the paste was applied to the bases A to D of Examples 1 to 4, thus producing sheets, which then were dried with hot air at 110° C. for 10 minutes. As Comparative example, using the support described in Example 1 (a punched metal sheet made of nickel) as a base (in the following, referred to as a base X), a sheet was produced in a similar manner. Then, these five different sheets were rolled to have a thickness of 400 μm using a roller press and cut into each electrode plate. Finally, a lead made of nickel (with a thickness of 0.1 mm and a width of 1 mm) was welded to one side of each electrode plate, thus obtaining five different positive electrode plates. The positive electrode plates using the bases A, B, C and D respectively are referred to as positive electrode plates A1, B1, C1 and D1. In addition, the positive electrode plate of Comparative example using the base X is referred to as a positive electrode plate X1.

Example 6

In Example 6, an example of producing a positive electrode plate by the manufacturing method of the fifth embodiment by using the bases A, B, C and D will be described.

First, active material powder and cobalt hydroxide powder were prepared in a manner similar to that in Example 5. Next, 100 parts by weight of the active material powder and 10 parts by weight of the cobalt hydroxide powder were mixed sufficiently by a kneader, and the resultant mixed powder was filled in a hopper. Subsequently, the bases A to D of Examples 1 to 4 were passed through this hopper. As Comparative example, the support described in Example 1 (the base X) was used as a base and passed through the hopper in a similar manner. When passing the base, the hopper was vibrated for the purpose of filling the active material in the porous layers. Furthermore, in order to prevent the shedding of the active material, two rollers were arranged in such a manner as to be spaced by 0.7 mm at an exit of the hopper, and the base that came out from the hopper was pressed. In this manner, four different sheets including the bases A to D whose porous layers were filled with the active material powder were produced. In addition, a sheet including the base X, to whose surfaces the active material powder was applied, was produced.

The resultant five different sheets were immersed in water dispersion of polytetrafluoroethylene (manufactured by Asahi Glass Co., Ltd.: AD936), so that the polytetrafluoroethylene was made to adhere to the surfaces of the sheets. Then, these sheets were dried with hot air at 110° C. for 10 minutes and cut into each electrode plate. Finally, a lead made of nickel (with a thickness of 0.1 mm and a width of 1 mm) was welded to one side of each electrode plate, thus obtaining five different positive electrode plates. The positive electrode plates using the bases A, B, C and D respectively are referred to as positive electrode plates A2, B2, C2 and D2. In addition, the positive electrode plate of Comparative example using the base X is referred to as a positive electrode plate X2.

Example 7

In Example 7, an example of producing a SC size nickel metal-hydride storage battery with a nominal capacity of 3500 mAh (1 hour rate 1C=3500 mAh) using the eight different positive electrode plates produced in Examples 5 and 6will be described. Incidentally, the battery produced in Example 7 is a battery with an increased capacity since the nominal capacity of SC size batteries in general is about 3000 mAh.

More specifically, for the negative electrode plate, a negative electrode plate formed mainly of a hydrogen absorbing alloy was used. For the separator, a polypropylene nonwoven fabric that was treated to be hydrophilic was used. For the electrolyte, an electrolyte containing 8N potassium hydroxide as a main solute was used.

After each of the batteries was assembled, a charge-discharge cycle of charging the battery for 15 hours at a charge rate of 0.1 C (350 mAh) and discharging it for 4 hours at a discharge rate of 0.2 C was conducted twice. Thereafter, the battery was allowed to stand for 3 days in a 45° C. environment, thereby activating a negative electrode alloy.

With respect to the batteries activated as above, the utilization factor of a positive electrode was evaluated by measuring a discharge capacity of the batteries. The discharge capacity was measured by charging the battery for 7.5 hours at a charge rate of 0.2 C, allowing it to stand for 30 minutes and then discharging it at a constant discharge rate until the battery voltage reached 0.8 V The discharge rate (current value) was 0.76 A, 10 A, 20 A or 30 A. The utilization factor of a positive electrode is calculated by Utilization factor (%)=(Measured discharge capacity)/(Theoretical positive electrode capacity)×100. Here, the theoretical positive electrode capacity is a value obtained by multiplying the mass of nickel hydroxide in the active material by a capacitance of 289 mAh/g when the nickel hydroxide is assumed to undergo one-electron reaction. The results of the utilization factor evaluation are shown in Table 1. Herein, the batteries using the positive electrode plates A1 to D1, A2 to D2 and X1 to X2 respectively are referred to as batteries A1 to D1, A2 to D2 and X1 to X2.

TABLE 1

| | Base material | Utilization factor of positive electrode [%] | | | |
|---|---|---|---|---|---|
| | | Discharge rate 0.76 A | Discharge rate 10 A | Discharge rate 20 A | Discharge rate 30 A |
| Battery A1 | Base material A | 100 | 96 | 93 | 89 |
| Battery B1 | Base material B | 100 | 96 | 93 | 89 |
| Battery C1 | Base material C | 100 | 96 | 93 | 88 |
| Battery D1 | Base material D | 100 | 96 | 94 | 90 |
| Battery X1 | Base material X | 98 | 95 | 87 | 75 |
| Battery A2 | Base material A | 100 | 97 | 95 | 92 |
| Battery B2 | Base material B | 100 | 97 | 95 | 92 |
| Battery C2 | Base material C | 100 | 97 | 95 | 92 |
| Battery D2 | Base material D | 100 | 97 | 95 | 92 |
| Battery X2 | Base material X | 98 | 96 | 89 | 76 |

As shown in Table 1, the batteries A1 to D1 and A2 to D2 using the bases A to D of the first embodiment had a higher utilization factor of a positive electrode, especially, that during high-rate discharging, than the batteries X1 and X2 using the base X of Comparative example. This may be because the bases of the present invention include the porous layers and, therefore, have a large specific surface area, which leads to superior current-collecting characteristics.

Also, the batteries A2 to D2 had better high-rate discharge characteristics than the batteries A1 to D1. This may be because the positive electrode plates of the batteries A1 to D1 contained CMC, which lowered the current-collecting characteristics of the positive electrode plates.

Furthermore, the charge-discharge cycle characteristics of the above-described eight different batteries were examined. One charge-discharge cycle included charging at a charge rate of 1C based on a dT/dt control system (dT=1.5° C., dt=30 seconds) followed by discharging at a current value of 10 A until the battery voltage reached 0.8 V. The results of the measurement are shown in FIG. 5.

Figure 5:
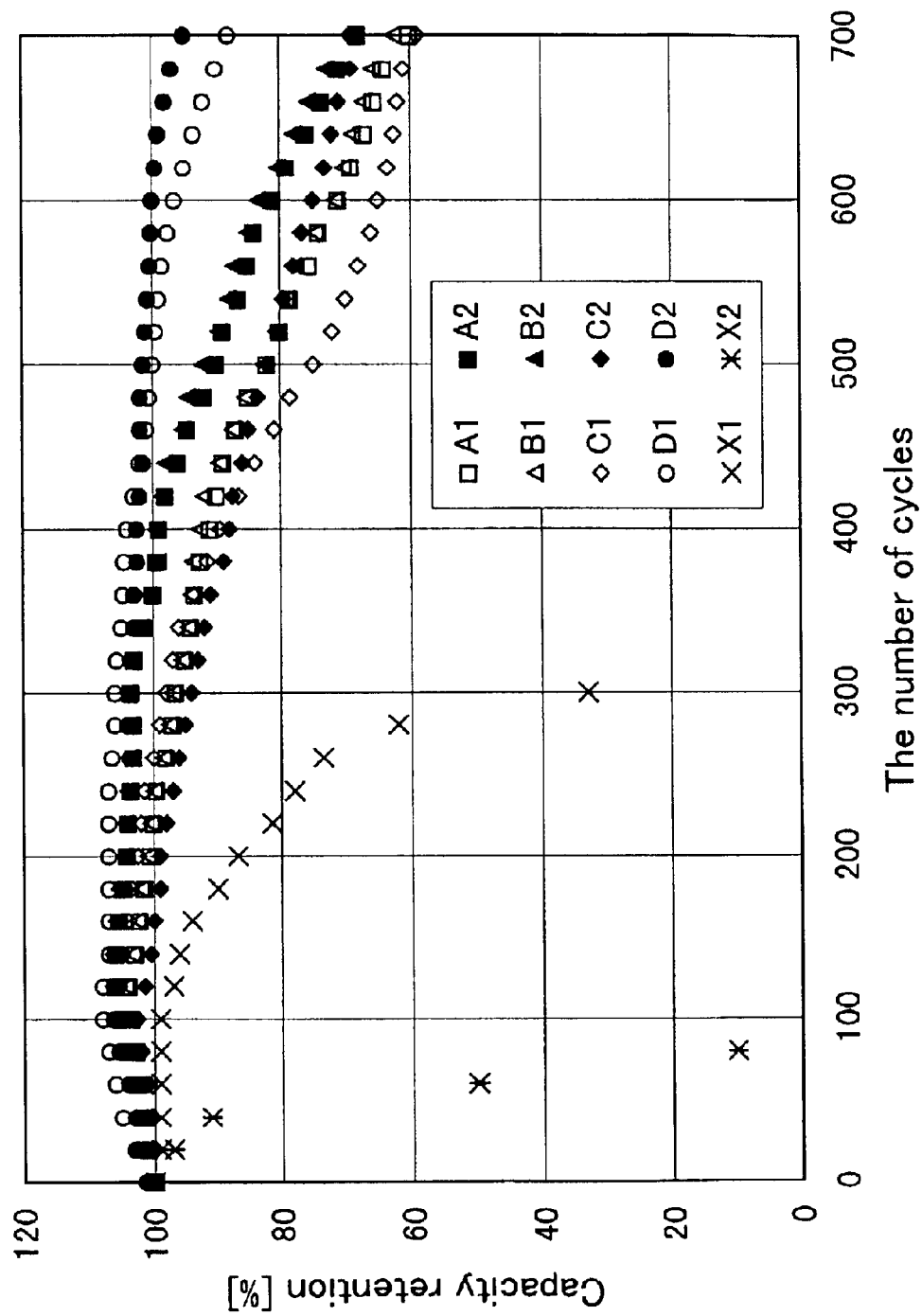
FIG. 5 is a graph showing the relationship between the number of cycles and the capacity retention with respect to the alkaline storage batteries of the present invention and alkaline storage batteries of Comparative examples.

As becomes dear from FIG. 5, as the charge-discharge cycles elapsed, the batteries A1 to D1 and A2 to D2 of the present invention showed a smaller decrease in the capacity than the batteries X1 and X2 of Comparative example. This may be because the bases A to D had an excellent ability to retain the active material powder, suppressing the shedding of the active material owing to the expansion and contraction thereof during charging and discharging.

In addition, when the batteries of the present invention were compared, it was found that there were relationships in which the battery C1<the battery A1<the battery B1<the battery D1 and the battery C2<the battery A2<the battery B2<the battery D2 in their capacity retention. This may be because there was a relationship in which the base C<the base A<the base B<the base D in their homogeneity. Also, when the batteries A1 to D1 and the batteries A2 to D2 were compared, it was found that the latter had a higher capacity retention than the former. This may be because the positive electrode plates of the batteries A2 to D2 did not contain CMC, suppressing the degradation of the negative electrode caused by CMC decomposition and the tendency that an electrolyte concentrates toward the positive electrode. Furthermore, no significant difference in the capacity retention was found between the battery A1 and the battery B1 and between the battery A2 and the battery B2. This indicates that the capacity retention does not vary depending on materials.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for manufacturing a base for an electrode plate used as an electrode plate of a storage battery, comprising:
   (i) forming a slurry containing water, a powder containing nickel, stearic acid and a hollow particle formed of an organic compound, the powder being absorbed on the surface of the hollow particle via the stearic acid;
   (ii) applying the slurry to a support made of metal, thereby forming a sheet; and
   (iii) burning the sheet, thereby forming a porous layer joined to the support by a metallic bond.

2. The method according to claim 1, wherein the slurry contains a thickener.

3. The method according to claim 2, wherein the thickener contains at least one selected from the group consisting of cellulose, a cellulose derivative and polyvinyl alcohol.

4. The method according to claim 1, wherein the hollow particle contains a polymer formed by polymerizing a monomer containing at least one selected from the group consisting of methyl methacrylate, acrylonitrile and vinylidene chloride, and at least one selected from the group consisting of isobutane, isopentane and isooctane is sealed in the hollow particle.

5. The method according to claim 1, wherein the hollow particle in the (i) forming has a diameter ranging from 10 to 40 μm, and after the (ii) applying and before the (iii) burning, the method comprises the process of expanding the hollow particle by heat-treating the sheet so that the hollow particle achieves a maximum diameter ranging from 100 to 300 μm.

6. The method according to claim 1, wherein the hollow particle in the (i) forming has a diameter ranging from 100 to 300 μm.

7. The method according to claim 1, wherein the powder contains at least one material selected from the group consisting of a metallic nickel and a nickel compound.

8. A method for manufacturing a positive electrode plate for an alkaline storage battery, comprising:

filling a base with a slurry containing a binder and an active material powder containing nickel hydroxide, followed by drying and rolling;

wherein the base comprises a support made of metal and a porous layer formed on the support, the porous layer being made of nickel and having a porosity ranging from 90% to 98%, and the support and the porous layer being joined by a metallic bond.

9. The method according to claim 8, wherein the support is a processed foil obtained by forming protrusion on a surface of a metal foil or a punched metal sheet obtained by forming through holes in a metal foil, and the metal foil is a nickel foil formed by electroplating or a metal foil whose surface is coated with nickel.

10. A method for manufacturing a positive electrode plate for an alkaline storage battery, comprising:

(I) filling a base with an active material powder containing nickel hydroxide and rolling it, thereby fanning a sheet comprising the base and an active material filled in the base;

(II) immersing the sheet in a solution in which a binder is dispersed, thereby making the binder adhere to a surface of the sheet; and (III) drying and rolling the sheet to which the binder has adhered;

wherein the base campuses a support made of metal and a porous layer formed on the support, the porous layer being made of nickel and having a porosity ranging front 90% to 98%, and the support and the porous layer being joined by a metallic bond.

11. The method according to claim 10, wherein the support is a processed foil obtained by forming protrusions on a surface of a metal foil or a punched metal sheet obtained by forming through holes in a metal foil, and the metal foil is a nickel foil fanned by electroplating or a metal foil whose Surface is coated with nickel.

12. An alkaline storage battery comprising a positive electrode plate; the positive electrode plate comprising;

the base for an electrode plate manufactured by the method according to claim 1, and an active material powder containing nickel hydroxide filled in the base.

* * * * *